United States Patent
Biswas et al.

(10) Patent No.: US 12,005,918 B2
(45) Date of Patent: Jun. 11, 2024

(54) SYSTEM AND METHOD FOR PROVIDING ASSISTANCE TO VEHICLE OCCUPANTS

(71) Applicant: Wipro Limited, Bangalore (IN)

(72) Inventors: Nilanjan Biswas, Rajarhat (IN); Shantanu Banerjee, Howrah (IN); Kyunglack Kim, Gyeonggi-do (KR); Abhishek Chatterjee, Kolkata (IN)

(73) Assignee: Wipro Limited, Bangalore (IN)

( * ) Notice: Subject to any disclaimer, the term of this patent is extended or adjusted under 35 U.S.C. 154(b) by 248 days.

(21) Appl. No.: 17/456,170

(22) Filed: Nov. 23, 2021

(65) Prior Publication Data
US 2023/0069413 A1 Mar. 2, 2023

(30) Foreign Application Priority Data
Sep. 1, 2021 (IN) .............................. 202141039663

(51) Int. Cl.
*B60W 50/14* (2020.01)
*B60W 40/04* (2006.01)
*B60W 40/08* (2012.01)
*G06F 3/0481* (2022.01)
*G06N 3/08* (2023.01)

(52) U.S. Cl.
CPC ............ *B60W 50/14* (2013.01); *B60W 40/04* (2013.01); *B60W 40/08* (2013.01); *G06N 3/08* (2013.01); *B60W 2554/4029* (2020.02); *B60W 2555/20* (2020.02); *B60W 2556/45* (2020.02); *G06F 3/0481* (2013.01)

(58) Field of Classification Search
CPC ...... B60W 50/14; B60W 40/04; B60W 40/08; B60W 2554/4029; B60W 2556/45; B60W 2555/20; G06N 3/08; G06F 3/0481
See application file for complete search history.

(56) References Cited

U.S. PATENT DOCUMENTS

| | | | |
|---|---|---|---|
| 10,449,968 B2 | 10/2019 | Shaikh et al. | |
| 2014/0310594 A1 | 10/2014 | Ricci et al. | |
| 2015/0160019 A1 | 6/2015 | Biswal et al. | |
| 2016/0328272 A1* | 11/2016 | Ahmed | G06F 9/4881 |
| 2017/0092126 A1* | 3/2017 | Oshida | G08G 1/005 |

(Continued)

FOREIGN PATENT DOCUMENTS

CN 110310017 A * 10/2019 ....... G06Q 10/06393

*Primary Examiner* — Behrang Badii
*Assistant Examiner* — Jay Khandpur
(74) *Attorney, Agent, or Firm* — Finnegan, Henderson, Farabow, Garrett & Dunner, LLP

(57) ABSTRACT

A system and method for providing assistance to vehicle occupants is disclosed. The method includes the steps of receiving a set of static information and a set of dynamic information associated with each of a vehicle, a set of Human Machine Interfaces (HMIs), and an occupant within the vehicle; processing the set of static information and the set of dynamic information through at least one of a first Artificial Neural Network (ANN) Model and a rule engine; determining an accessibility score for the occupant in response to an event based on an output of the processing; generating at least one of at least one accessibility compliant HMI content for at least one of the set of HMIs and vehicle control content for the vehicle based on the accessibility score; and executing at least one of the at least one accessibility compliant HMI content and the vehicle control content.

14 Claims, 9 Drawing Sheets

(56) References Cited

U.S. PATENT DOCUMENTS

| | | |
|---|---|---|
| 2018/0068653 A1* | 3/2018 | Trawick .................. G10L 15/16 |
| 2018/0211115 A1* | 7/2018 | Klein .................... G08B 29/188 |
| 2019/0286153 A1* | 9/2019 | Rankawat ............ G05D 1/0246 |
| 2021/0133219 A1* | 5/2021 | Kristinsson ............. H04L 67/52 |
| 2021/0306421 A1* | 9/2021 | Biswas ................. H04L 67/146 |
| 2022/0080968 A1* | 3/2022 | Zhu ................. B60W 30/18163 |
| 2023/0256373 A1* | 8/2023 | Johnson ............. B01D 46/0086 |
| | | 701/34.4 |

* cited by examiner

SYSTEM AND METHOD FOR PROVIDING ASSISTANCE TO VEHICLE OCCUPANTS

TECHNICAL FIELD

The invention relates to assistive vehicle devices. In particular, the invention relates to system and method for providing assistance to vehicle occupants.

BACKGROUND

Vehicle driving systems include various assistive vehicle devices to provide assistance to drivers such as, a distance control device, a speed control device, a collision avoidance device, a tire pressure monitoring device, a corner warning device for timely warning of corners, a braking, and/or steering intervention device. Further, for the people having permanent disabilities (for example people who are blind/low vision or mobility impaired) various self-driving vehicles with assistive vehicle devices are available. However, these vehicles and associated assistive vehicle devices may only consider static accessibility needs of the driver and/or the environmental accessibility needs, and lack in dynamically determining accessibility needs of the vehicle driver. Also, the assistive vehicle devices are unable to react to fatal conditions of occupants with the accessibility needs, for the emergency services/nearby pedestrian/vehicle.

Today, various conventional systems and methods are available for providing assistance to occupants or drivers. However, the conventional systems and methods lack in priority management amongst multiple generated dynamic content. Further, the conventional systems consider data generated within the system only. Additionally, the conventional systems fail to disclose curation of dynamic content by third party applications based on current vehicle model, HMI screen theme, screen fonts, screen predominant colors, and free space available to create a uniform non-distracting viewing experience for the drivers.

SUMMARY

In one embodiment, a method of providing assistance to vehicle occupants is disclosed. In one embodiment, the method may include receiving a set of static information and a set of dynamic information associated with each of a vehicle, a set of Human Machine Interfaces (HMIs), and an occupant within the vehicle. The method may further include processing the set of static information and the set of dynamic information through at least one of a first Artificial Neural Network (ANN) Model and a rule engine. The method may further include determining an accessibility score for the occupant in response to an event based on an output of the processing. The method may further include generating at least one of at least one accessibility compliant HMI content for at least one of the set of HMIs and vehicle control content for the vehicle based on the accessibility score. The vehicle control content may be associated with driving instructions. The method may further include executing at least one of the at least one accessibility compliant HMI content and the vehicle control content.

In yet another embodiment, a system for providing assistance to vehicle occupants is disclosed. The system includes a processor and a memory communicatively coupled to the processor, wherein the memory stores processor instructions, which, on execution, cause the processor to receive a set of static information and a set of dynamic information associated with each of a vehicle, a set of Human Machine Interfaces (HMIs), and an occupant within the vehicle. The processor instructions further cause the processor to process the set of static information and the set of dynamic information through at least one of a first Artificial Neural Network (ANN) Model and a rule engine. The processor instructions further cause the processor to determine an accessibility score for the occupant in response to an event based on an output of the processing. The processor instructions further cause the processor to generate at least one of at least one accessibility compliant HMI content for at least one of the set of HMIs and vehicle control content for the vehicle based on the accessibility score. The vehicle control content may be associated with driving instructions. The processor instructions further cause the processor to execute at least one of the at least one accessibility compliant HMI content and the vehicle control content.

In yet another embodiment, a non-transitory computer-readable medium storing computer-executable instructions for providing assistance to vehicle occupants is disclosed. In one example, the stored instructions, when executed by a processor, may cause the processor to perform operations including receiving a set of static information and a set of dynamic information associated with each of a vehicle, a set of Human Machine Interfaces (HMIs), and an occupant within the vehicle. The operations may further include processing the set of static information and the set of dynamic information through at least one of a first Artificial Neural Network (ANN) Model and a rule engine. The operations may further include determining an accessibility score for the occupant in response to an event based on an output of the processing. The operations may further include generating at least one of at least one accessibility compliant HMI content for at least one of the set of HMIs and vehicle control content for the vehicle based on the accessibility score. The vehicle control content may be associated with driving instructions. The operations may further include executing at least one of the at least one accessibility compliant HMI content and the vehicle control content.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
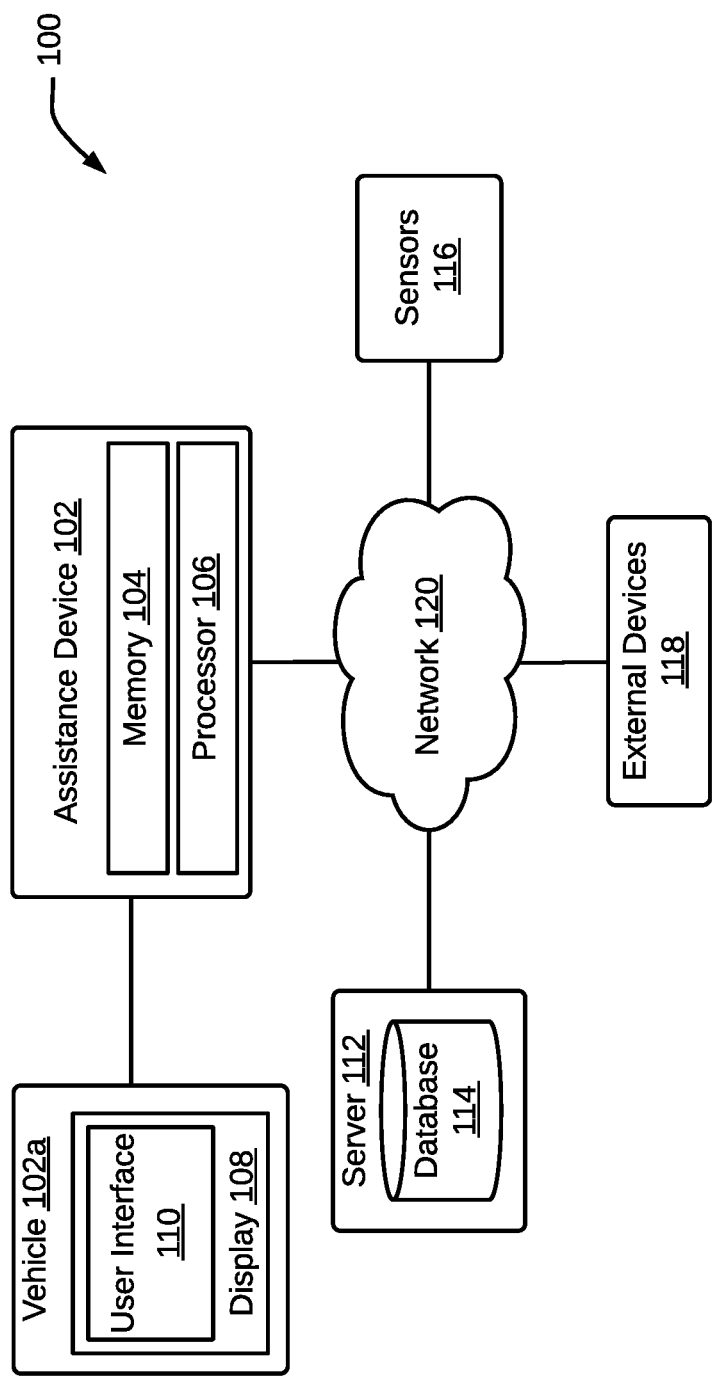
FIG. 1 is a block diagram of a system for providing assistance to vehicle occupants, in accordance with an embodiment.

In one embodiment, a system 100 for providing assistance to vehicle occupants is illustrated in the FIG. 1. The system 100 may include an assistance device configured to provide assistance to vehicle occupants (for example, occupant(s) of a vehicle 102*a*). Examples of the assistance device 102 may include, but are not limited to, a server, a desktop, a laptop, a notebook, a netbook, a tablet, a smartphone, a mobile phone, an application server, a vehicle dashboard or the like.

The assistance device 102 may include a memory 104 and a processor 106. The memory 104 and the processor 106 of the assistance device 102 may perform various functions including receiving static information and dynamic information, processing the static information and the dynamic information, determining accessibility scores, generating content, executing content, validating contextual appropriateness, rendering content, assigning priorities, validating content, and modifying content. The memory 104 may store instructions that, when executed by the processor 106, cause the processor 106 to execute at least one of the at least one accessibility compliant HMI content and the vehicle control content to provide assistance to the vehicle occupants. The memory 104 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

In some embodiments, the assistance device 102 may interact with the display 108. The display 108 may further include a user interface 110. Further, in some other embodiments, the assistance device 102 may include a display (not shown in FIG. 1 and same as the display 108), which may further include a user interface (same as the user interface 110). An occupant may interact with the assistance device 102 and vice versa through the display 108. By way of an example, the display 108 may be used to display results of analysis (i.e., generated accessibility compliant HMI content and vehicle control content or driving instructions) performed by the assistance device 102, to the occupant of the vehicle 102*a*. By way of another example, in some embodiments, the user interface 110 may be used by the occupant to provide inputs to the assistance device 102.

As will be described in greater detail in conjunction with FIG. 2 to FIG. 8, in order to provide assistance to the occupants, the assistance device 102 may extract data from a server 112. The server 112 may further include a database 114 to store various type of data(for example, for example pre-defined rules, predefined preferences, pre-determined accessibility data, various instructions).

The data may also be received by the assistance device 102 from sensors 116 and external devices 118. By way of an example, the data received from the sensors 116 may include environmental data, vehicle data, health data, HMI state data, and the like. Examples of the plurality of external devices 118 may include, but are not limited to, a desktop, a laptop, a notebook, a netbook, a tablet, a smartphone, a remote server, a mobile phone, a vehicle dashboard, Human Machine Interfaces (HMIs) or another computing system/device. The assistance device 102 may generate and render accessibility compliant HMI content and/or vehicle control content with the external devices 118. The sensors 116 and the external devices 118 may be communicatively coupled to the assistance device 102, via a network 120. The network 120 may correspond to a communication network. The network 120 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
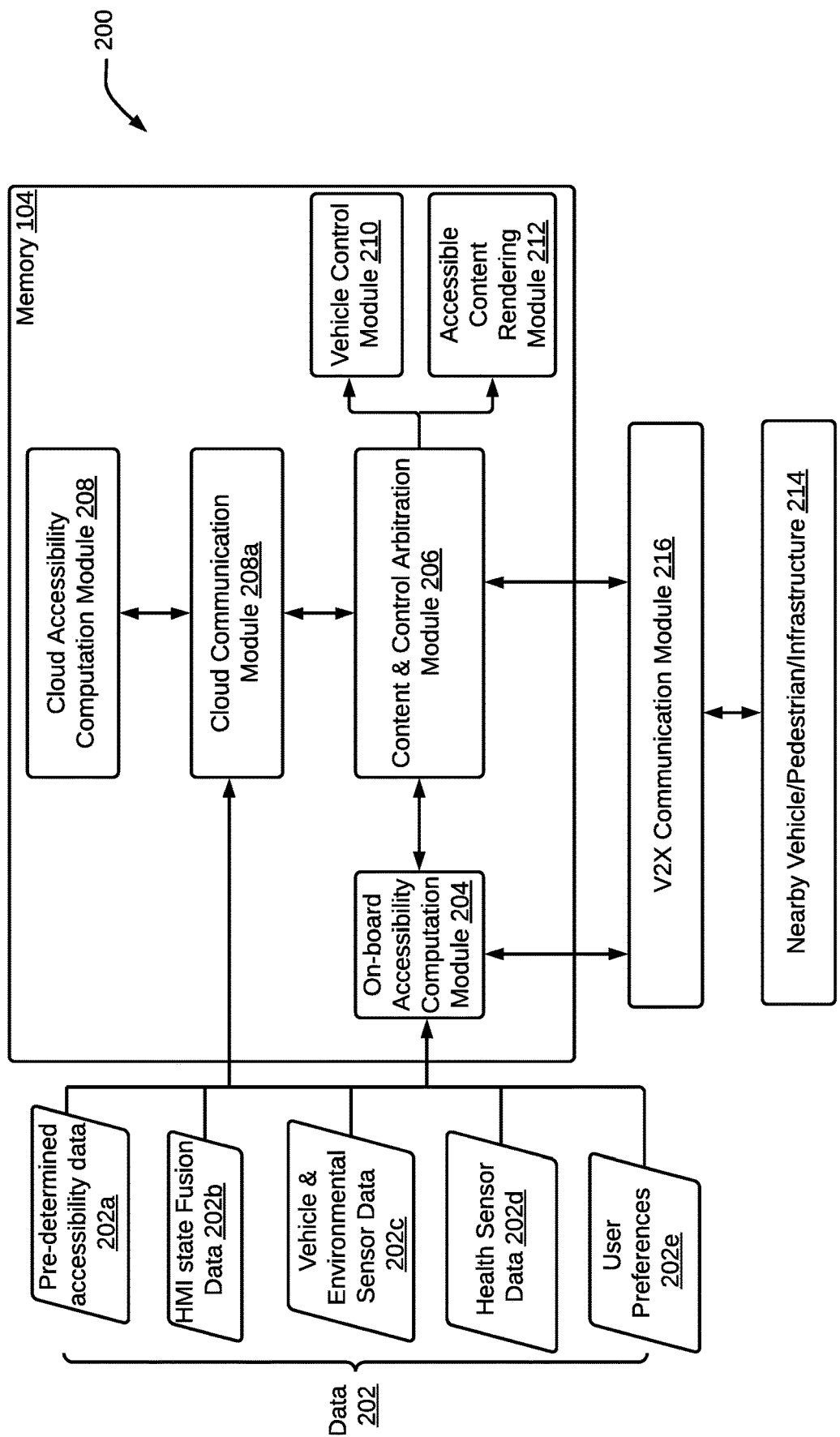
FIG. 2 is a functional block diagram of various modules within a memory of an assistance device configured to provide assistance to vehicle occupants, in accordance with an embodiment.

Referring now to FIG. 2, a block diagram 200 of various modules within the memory 104 of the assistance device 102 configured to provide assistance to vehicle occupants is illustrated, in accordance with an embodiment. FIG. 2 is explained in conjunction with FIG. 1. The memory 104 may receive data 202. It should be noted that the data 202 may include pre-determined accessibility data 202*a*, HMI state fusion data 202*b*, vehicle and environmental sensor data 202*c*, health sensor data 202*d*, and user preferences 202*e*. The pre-determined accessibility data 202*a* may include known permanent disabilities of an occupant. For example, the known permanent disabilities are those disabilities which the occupant is already aware of before travelling in the vehicle 102*a*. Further, the known permanent disabilities may include, but not limited to, medical historical data and issues, such as, seizure, eyesight problem, and color blindness. The known permanent disabilities may require modification in a current Human Machine Interface (HMI).

In some embodiments, the pre-determined accessibility data may be provided by the occupants while buying the vehicle 102*a*. In some other embodiments, the pre-determined accessibility data may be directly extracted by the assistance device 102 from a third-party health data provider and an associated management database of hospitals and clinics.

The HMI state fusion data 202*b* may include information regarding a current HMI state of the vehicle 102*a*. It should be noted that a variety of vehicle may have different HMI systems. Examples of the HMI systems may include, but not limited to, a center stack, an instrument cluster, a steering wheel control and a haptic feedback (i.e., vibration) system, a speaker system, a Head Up Display (HUD), and the like. In some embodiments, capability and state of each HMI component may be determined in order to identify available and appropriate HMI system to render the information.

The vehicle and environmental sensor data 202*c* may be captured using various sensors. Vehicle sensors may capture vehicle sensor data. The vehicle sensors may include an accelerometer, a vehicle brake sensor, advance driver assistance (ADAS) sensors, a vehicle swerves sensor, a vehicle vibration sensor, and Controller Area Network (CAN) bus. In some embodiments, data from an environmental sensor and from external device or roads/nearby infrastructure services may also be captured. Further, the captured data may be synthesized and provided as an input for proper determination of accessibility needs and context in particular instance of time and place.

The health sensor data 202d may include health information of the occupant along with medical needs of the occupants, which may be used to determine the accessibility needs of the occupant while driving the vehicle 102a. The health sensor data 202d may be captured directly from body health sensors.

The user preferences 202e may include occupant's accessibility preferences. Examples of the occupant's accessibility preferences may include, but not limited to, screen contrast brightness, pre-set volume, font size, font type, and the like. In some embodiments, the user preferences 202e may be provided by the occupant through a native software setting of the on-board HMI systems.

Further, the memory 104 includes various modules 204-212 for performing multiple operations in order to provide assistance to vehicle occupants. The modules 204-212 within the memory 104 may include an on-board accessibility computation module 204, a content and control arbitration module 206, a cloud accessibility computation module 208, a cloud communication module 208a, a vehicle control module 210, an accessible content rendering module 212.

The on-board accessibility computation module 204 may receive a continuous stream of the data 202. The data 202 may include a set of static information and a set of dynamic information associated with each of a vehicle, a set of Human Machine Interfaces (HMIs), and the occupant within the vehicle 102a. The HMI state fusion data 202b, the vehicle and environmental sensor data 202c, and the health sensor data 202d may be received from various sensors. Further, the data 202 may also include the pre-determined accessibility data 202a, and the user preference 202e of the occupant. The on-board accessibility computation module 204 may be configured to determine an accessibility score for the occupant. The accessibility score is function of data 202, as given below:

Accessibility Score=f (HMI state fusion data, vehicle and environmental sensor data, predetermined accessibility data, health sensor data, user preferences)

It should be noted that the on-board accessibility computation module 204 may include a first Artificial Neural Network (ANN), through which the data 202 (i.e., the set of static information and the set of dynamic information) may be processed. In some other embodiments, then-board accessibility computation module 204 may include a rule engine. In other words, in response to an event and based on the processing of the data 202 through the first ANN or the rule engine, the on-board accessibility computation module 204 may determine the accessibility score for the occupant. Further, the on-board accessibility computation module 204 may also communicate with a nearby vehicle 214 that may be associated with the same system 100 via a V2X communication module 216 to reinforce and validate the accessibility score. Additionally, the on-board accessibility computation module 204 dynamically identifies an appropriate HMI based on the accessibility needs of the occupant. Further, the on-board accessibility computation module 204 may generate at least one of at least one accessibility compliant HMI content for at least one of the set of HMIs and vehicle control content for the vehicle based on the accessibility score. The on-board accessibility computation module 204 may be explained in greater detail in conjunction with FIG. 3. The on-board accessibility computation module 204 may be communicatively coupled to the content and control arbitration module 206.

The output of the on-board accessibility computation module 204 may be transmitted to the content and control arbitration module 206 for rendering content (for example, the at least one accessibility compliant HMI content and/or the vehicle control content) on one or more HMI systems within the vehicle 102a. In some embodiments, the content may be rendered on the HMI system of a nearby vehicle, and a pedestrian smartphone associated with the same system 100. By way of an example, while generating the content dynamically, an HMI component of a nearby vehicle may be used. The HMI component may be previously received HMI from a cloud system for a similar accessibility score scenario and may have cached the content for future use. Hence, by reducing time of communicating with the cloud system, network latency may be reduced in delivering appropriate content to an accessible occupant. The on-board accessibility computation module 204 may also be configured for determining a right set of HMIs to render the content based on content type, vehicle model, and associated available HMIs within the vehicle or the nearby vehicle 214 along with content priority.

The content and control arbitration module 206 may receive the content from the on-board accessibility computation module 204 and the cloud accessibility computation module 208 via the cloud communication module 208a. For example, accessibility compliant HMI content and/or vehicle control content may be received from the on-board accessibility computation module 204, and cloud-based accessibility compliant HMI content and/or cloud-based vehicle control content from the cloud accessibility computation module 208. Further, the content and control arbitration module 206 may arbitrate the content based on priority, availability of HMIs and severity of the message being displayed before transmitting the content to HMI system within the vehicle, the HMI system of a nearby vehicle, and/or pedestrian smartphone. The content and control arbitration module 206 may send the accessibility score and generated local content to the cloud accessibility computation module 208 for further validation and learning. Moreover, the content and control arbitration module 206 may receive an updated content from the cloud accessibility computation module 208 based on the quality of the locally generated content. By way of an example, a partially or completely impaired occupant may not be able to drive the vehicle. Thus, the accessibility score of the occupant may not be within a predefined threshold and the condition may be severe enough. In such case, the content and control arbitration module 206 may receive vehicle control signals from the nearby vehicle 214 (associated with the system 100) through the V2X communication module 216 in a form of coordinated or guided driving. The content and control arbitration module 206 is further explained in conjunction with FIG. 4.

The cloud communication module 208a is a communication gateway between the content and control arbitration module 206 and the cloud accessibility computation module 208. Further, the cloud accessibility computation module 208 may be configured to continuously receive the data 202. The cloud communication module 208a may include at least one of a second ANN Model and a cloud-based rule engine Further, the cloud communication module 208a may be configured to determine a cloud-based accessibility score for the occupant in response to the event, when the data 202 is processed through at least one of the second ANN Model and/or a cloud-based rule engine. The cloud communication module 208a may generate at least one of the at least one cloud-based accessibility compliant HMI content for at least one of the set of HMIs for the occupant and the cloud-based vehicle control content for the vehicle, based on the cloud-based accessibility score.

Additionally, in some embodiments, a validation of the generated accessibility score, the accessibility compliant HMI content, and the vehicle control content may be performed by the second ANN model and/or the cloud-based rule engine. By reinforcing the computed data with community data set, the cloud communication module 208a may determine necessity to change the accessibility score, the accessibility compliant HMI content, and the vehicle control content based on the quality of determination. Further, the cloud communication module 208a may send an updated content (such as, the cloud-based accessibility compliant HMI content and the cloud-based vehicle control content) to the content control arbitration module 206, if required. A detailed explanation for the cloud accessibility computation module 208 may be provided in FIG. 5.

The vehicle control module 210 may be responsible for controlling the vehicle. By way of an example, consider a scenario where the occupant is unable to respond appropriately due to accessibility constraints (such as, seizure and loss of consciousness). In such cases, the vehicle control module 210 may automatically perform a required action to control the vehicle. The required action may include, but not limited to, decelerate and stop the vehicle automatically, coordinated driving from a vehicle autonomous system or from the nearby vehicle 214.

The accessible content rendering module 212 may be configured to receive the dynamically generated accessibility compliant HMI content for one or more HMI systems within the vehicle and merge/blend the content over the existing content on the display. It should be noted that the nearby vehicle and a pedestrian smartphone may be associated with the system 100.

The V2X communication module 216 may include a communication gateway, which enables communication between the various modules (such as, the on-board accessibility computation module 204 and the content and control arbitration module 206) of the memory 104 and a nearby vehicle/infrastructure/pedestrian 214. By way of an example, the accessibility score generated by the on-board accessibility computation module 204 may be reinforced and validated based on historically computed scores in the nearby vehicle 214 for similar reference scenarios. In other words, the on-board accessibility computation module 204 may ask for dynamic content cached in nearby vehicle for similar computed accessibility scores. It should be noted that the dynamic content may be better and have faster response time than a dynamic content which may be generated by the cloud accessibility computation module 208, and thereby may have low network latency to reach to the vehicle.

Figure 3:
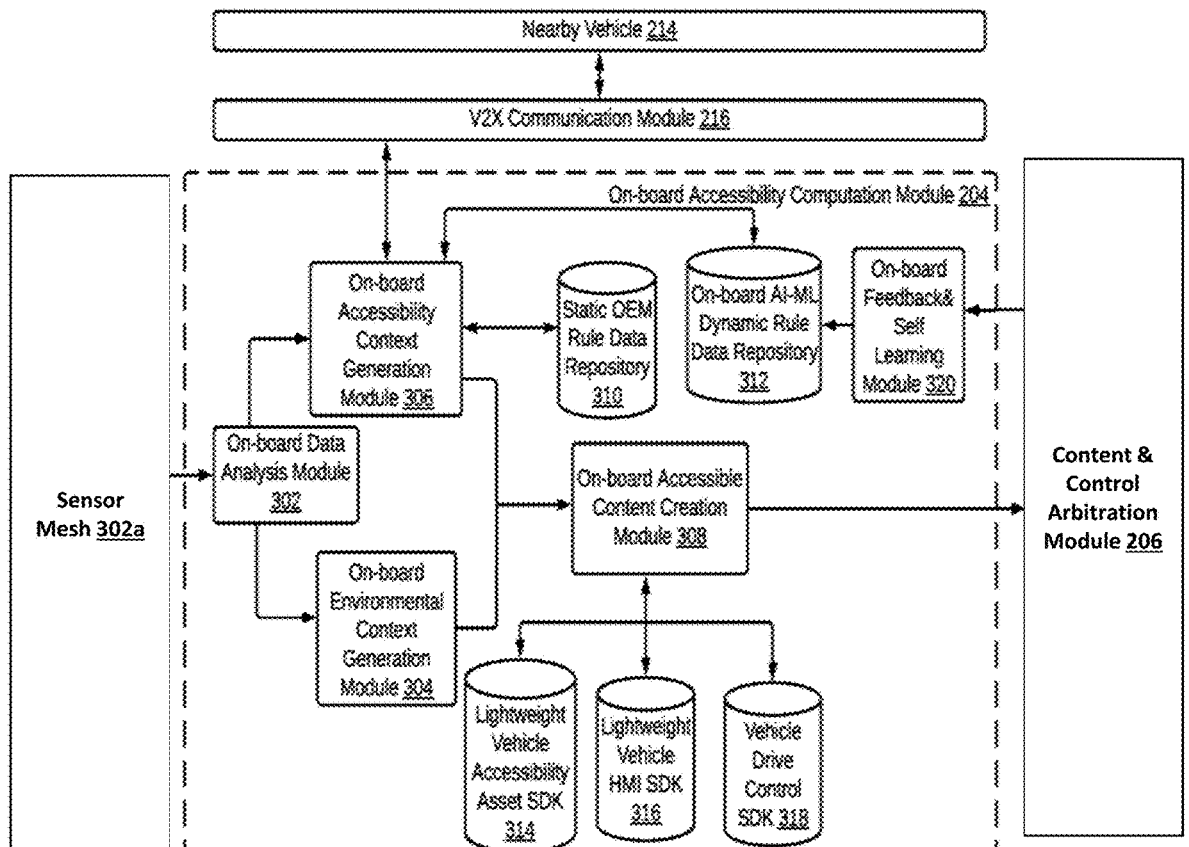
FIG. 3 is a functional block diagram of an on-board accessibility computation module, in accordance with an embodiment.

Referring now to FIG. 3, a block diagram of the on-board accessibility computation module 204 is illustrated, in accordance with an embodiment. FIG. 3 is explained in conjunction with FIG. 1 and FIG. 2. The on-board accessibility computation module 204 may further include various sub-modules including an on-board data analysis module 302, an on-board environmental context generation module 304, an on-board accessibility context generation module 306, and an on-board accessible content creation module 308.

The on-board data analysis module 302 may be configured to parse, filter and segregate data received from the sensor mesh 302a. Further, the on-board data analysis module 302 may be communicatively coupled to the on-board environmental context generation module 304 and the on-board accessibility context generation module 306.

The on-board environmental context generation module 304 may analyze the data received from the vehicle sensors and the environmental sensors around the vehicle. Further, the on-board environmental context generation module 304 may determine the environmental context based on analyzation. The environmental context may be then used for determining the accessibility score and determining the accessibility compliant HMI content. The environmental context may include, but not limited to, current weather information, traffic information, drive terrain, ambient light, nearby vehicle and pedestrian information.

On the other side, the on-board accessibility context generation module 306 may analyze the pre-determined accessibility data 202a, HMI state fusion data 202b, vehicle and environmental sensor data 202c, health sensor data 202d, and user preferences 202e to determine accessibility context for the occupant for that particular instance. The accessibility context may be used further for determining the accessibility score and generating the accessibility compliant HMI content. The on-board accessibility context may be represented by:

on-board accessibility context (priority, severity, availability)=fn(predetermined accessibility data, HMI state fusion data, vehicle and environmental sensor data, health sensor data, user preferences, dynamic rule set, static rule set, reference context from the nearby vehicle)

The on-board accessible content creation module 308 may determine a refined accessibility score. Further the on-board accessible content creation module 308 may also be responsible for generating an appropriate accessibility compliant HMI content and/or vehicle control content based on the environmental context and the accessibility context. It should be noted that a vehicle/Original Equipment Manufacturer (OEM) specific accessibility asset Software Development Kit (SDK), an HMI SDK, and a vehicle control SDK may be utilized in order to create dynamic HMI content and/or vehicle control content.

Further, the on-board accessibility computation module 204 may include a static OEM rule data repository 310, and an Artificial Intelligence (AI)—Machine Learning (ML) dynamic on-board rule data repository 312. The on-board accessible content creation module 308 may be communicatively coupled to the static OEM rule data repository 310. The static OEM rule data repository 310 may include a set of pre-defined rules by the OEM which may help the on-board accessible content creation module 308 in generating the refined accessibility score. The set of pre-defined rules may vary from vehicle to vehicle, region to region, and from one accessibility need type to another.

The AI-ML dynamic on-board rule data repository 312 learns based on a feedback on the generated content received from the occupant and cloud-based content. Whenever cloud-based content and the cloud-based accessibility score is received from the cloud accessibility computation module 208, it caches the cloud-based content for future use when a similar scenario is detected.

Further, as illustrated in FIG. 3, the on-board accessible content creation module 308 may be communicatively coupled to a lightweight vehicle accessibility asset SDK 314, a lightweight vehicle HMI SDK 316, and a vehicle drive control SDK 318. The lightweight vehicle accessibility asset SDK 314 may provide a predefined reusable accessibility compliant HMI component for a particular vehicle model. Each of the accessibility compliant HMI components may be mapped and verified against one or more determined accessibility types and accessibility scores. The lightweight vehicle accessibility asset SDK 314 may enable the on-board content creation module 308 to create an appropriate content (i.e., a best suited content) for a particular vehicle's HMI system and the accessibility needs of the occupant for a particular instance.

The lightweight vehicle HMI SDK 316 may provide an HMI system capability of a particular vehicle model and reusable HMI components which adheres to one or more HMI systems of that particular vehicle. Additionally, the lightweight vehicle HMI SDK 316 enables the on-board accessible content creation module 308 to generate a content which is best suited for a particular vehicle's HMI system.

The vehicle drive control SDK 318 may provide necessary control commands and vehicle capability information for the particular vehicle model to the on-board accessible content creation module 308, so that the generated refined content (drive control) adheres to the capabilities of the vehicle where the system is running. The vehicle drive control SDK 318 may include a standard set of protocols and messages that enable the appropriate control mechanism for the vehicle control and a vehicle to interact with their subsystem, sensors, controller using common in-vehicle interfaces. In some embodiments, the lightweight vehicle HMI SDK 316 and the vehicle drive control SDK 318 may be provided by the vehicle OEM.

In addition to the above discussed modules 302-308, the on-board accessibility computation module 204 may also employ an on-board feedback and self-learning module 320. The on-board feedback and self-learning module 320 may be configured to filter the feedback received from the vehicle in terms of whether the content is displayed or discarded by the vehicle due to at least one of a context change, a lesser priority, better content from cloud accessibility computation module 208, and occupant's intervention. Further, the on-board feedback and self-learning module 320 may be operatively connected to the on-board AI-ML dynamic rule data repository 312. The on-board feedback and self-learning module 320 may transmit feedback to the on-board AI-ML dynamic rule data repository 312 for future use in determining accessibility content.

Figure 4:
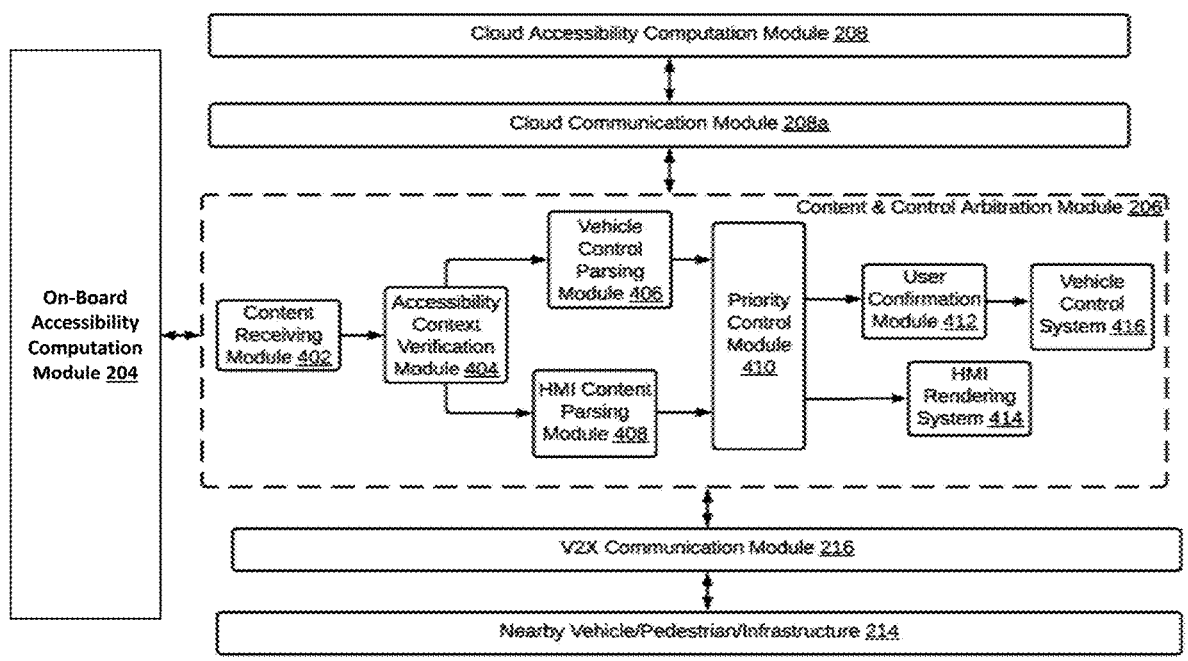
FIG. 4 is a functional block diagram of a content & control arbitration module, in accordance with an embodiment.

Referring now to FIG. 4, a block diagram of the content and control arbitration module 206 is illustrated, in accordance with an embodiment. FIG. 4 is explained in conjunction with FIGS. 1-3. The content and control arbitration module 206 may include various sub-modules 402-416. The sub-modules may include a content receiving module 402, an accessibility context verification module 404, a vehicle control parsing module 406, an HMI content parsing module 408, a priority control module 410, a user confirmation module 412, an HMI rendering system 414, and a vehicle control system 416.

The content receiving module 402 may be configured to receive and parse a packet including the accessibility compliant HMI content and the vehicle control content received from at least one of the on-board accessibility computation module 204, the cloud accessibility computation module 208, and the nearby vehicle/pedestrian smartphone 214. It should be noted that, in some embodiments, the accessibility compliant HMI content and the vehicle control content received from the cloud accessibility computation module 208 may be referred as the cloud-based accessibility compliant HMI content and the cloud-based vehicle control content, respectively. The content receiving module 402 may be operatively coupled to the accessibility context verification module 404.

The accessibility context verification module 404 may be configured to verify the accessibility context of the received accessibility compliant HMI content and the vehicle control content with current context to determine the contextual appropriateness of the received content associated with the occupant and the vehicle. The content generated by the cloud accessibility computation module 208 may be validated as there may be an additional delay in receiving such content due to network latency. During the delay, the accessibility context for which the HMI is received may cease to hold true at that instance. Accessibility Context Verification may be represented as—

Accessibility Context Verification=f(X, Y, Z), Where:
X=Σ(content data packet from the on-board accessibility computation module 204, the cloud accessibility computation module 208, and the V2X communication module 216),
Y=context of X, and
Z=current context associated with the occupant and the vehicle.

The accessibility context verification module 404 may be coupled to the vehicle control parsing module 406 and the HMI content parsing module 408. The vehicle control parsing module 406 may be an OEM defined vehicle control message parsing module which is configured for parsing vehicle control message to control various sensors and control various vehicle parameters, such as speed of the vehicle.

The HMI content parsing module 408 may be an OEM defined HMI content parsing module which may be configured to parse the accessibility compliant HMI content. The received content may enable the occupant to interact using a user interface, such as a touch screen display, embedded voice recognition, steering wheel controls, and various vehicle knobs and buttons. In some embodiments, the occupant may be a vehicle driver.

The priority control module 410 may control flow of accessibility compliant HMI content and vehicle control content (for example, messages) to the vehicle based on an order of assigned priority. It should be noted that one or more accessibility compliant HMI content may be generated at a time for a particular accessibility context from both the on-board accessibility computation module 204, and the cloud accessibility computation module 208. Therefore, a message with highest priority may be rendered and other messages may be discarded or queued.

The user confirmation module 412 may be configured to receive a user response, a user intervention, or a user action for confirmation. For example, if the occupant is in a condition of responding, the occupant may respond through touch, hard key, or provide a voice-based confirmation. The user confirmation module 412 may also receive user feedback on a dynamically generated accessibility compliant HMI content in context of relevancy. The user confirmation module 412 may be further connected to the vehicle control system 416. Further, the vehicle control system 416 may control vehicle parameters by interfacing with vehicle sensors and control system.

The HMI rendering system 414 may render the accessibility compliant HMI content on the available in-vehicle interfaces, such as an infotainment unit, an instrument cluster, an HUD, speakers, a rear seat entertainment unit, and the like.

Figure 5:
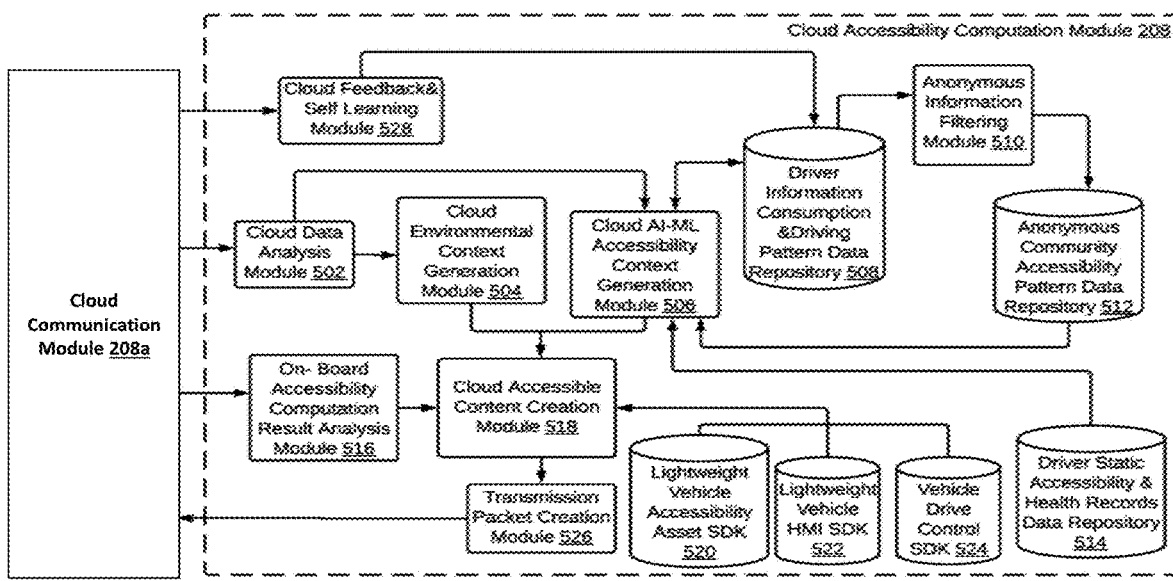
FIG. 5 is a functional block diagram of a cloud accessibility computation module, in accordance with an embodiment.

Referring now to FIG. 5, a block diagram of the cloud accessibility computation module 208 is illustrated, in accordance with an embodiment. FIG. 5 is explained in conjunction with FIGS. 1-4. The cloud accessibility computation module 208 may include a cloud data analysis module 502, a cloud environmental context generation module 504, a cloud AI-ML accessibility context generation module 506, a driver information consumption and driving pattern data repository 508, an anonymous information filtering module 510, an anonymous community accessibility pattern data repository 512, a driver static accessibility and health records data repository 514, an on-board accessibility computation result analysis module 516, a cloud accessible content creation module 518, a lightweight vehicle accessibility asset SDK 520, a lightweight vehicle HMI SDK 522, a vehicle drive control SDK 524, a transmission packet creation module 526, and a cloud feedback and self-learning module 528.

The cloud data analysis module 502 may be configured to parse, filter, and segregate data received from the sensor mesh 302a. The cloud data analysis module 502 may further redirects the data to the cloud environmental context generation module 504 and the cloud AI-ML accessibility context generation module 506.

The cloud environmental context generation module 504 may analyze the data from vehicle sensors and environmental sensors and based on that may determine environmental context. The environmental context may further be used for determining a cloud-based accessibility score and generating cloud-based accessibility compliant HMI content. The environmental context may include information about, but not limited to, current weather, traffic information, drive terrain, ambient light, nearby vehicles, and pedestrian information. Further, the cloud AI-ML accessibility context generation module 506 may analyze the data from the vehicle sensors, the health sensors associated with the occupant's body, the environmental sensors, the user preferences of the occupant, the HMI state fusion data, pre-determined accessibility data, driving patterns. Based on analyzation, the cloud AI-ML accessibility context generation module 506 may determine the accessibility context for the occupant for a particular instance. The accessibility context may be further used for determining the cloud-based accessibility score and generating the cloud-based accessibility compliant HMI content.

The driver information consumption and driving pattern data repository 508 may include previous driving records of various occupants with corresponding accessibility needs. Also, the driver information consumption and driving pattern data repository 508 may include data regarding driving patterns, abilities and user preferences.

The anonymous information filtering module 510 may be configured to create anonymity in the data collected for each occupant with corresponding accessibility needs, in order to maintain privacy of the occupant. As illustrated in FIG. 5, the anonymous data may then be stored in the anonymous community accessibility pattern data repository 512, which may be further used for AI-ML based learning to determine the accessibility context. The driver static accessibility and health records data repository 514 may include data associated with occupants' existing medical conditions, pre-determined semi-permanent, and pre-determined permanent accessibility needs, which affects driving and information processing capabilities of the driver in context of driving.

The on-board accessibility computation result analysis module 516 may be configured for analyzing the accessibility score and content generated locally by the on-board accessibility computation module 204 and determining requirement to create and deliver a better quality and more appropriate accessibility compliant HMI and vehicle control content.

The cloud accessible content creation module 518 may modify and refine the accessibility score and the content generated locally by the on-board accessibility computation module 204 in order to deliver a modified, refined, and more appropriate accessibility compliant HMI content and vehicle control content based on the environmental and accessibility context. To this end, the cloud accessible content creation module 518 may use the lightweight vehicle specific accessibility asset SDK 520, the lightweight vehicle HMI SDK 522, and the vehicle drive control SDK 524 to create the dynamic content.

The vehicle accessibility asset SDK 520 may provide predefined reusable accessibility compliant HMI components for a particular vehicle model. Each of the accessibility compliant HMI components may be mapped to one or many determined accessibility types and accessibility scores. Further, the vehicle accessibility asset SDK 520 enables the cloud accessibility content creation module to create best suited content for a particular vehicle's HMI system and the accessibility needs of the occupant at that instance.

The lightweight vehicle HMI SDK 522 may provide HMI system capability of a particular vehicle model and reusable HMI components which adheres to one or more HMI systems of that particular vehicle. Also, the lightweight vehicle HMI SDK 522 enables the cloud accessibility content creation module 518 to create best suited content for a particular vehicle's HMI system. The vehicle drive control SDK 524 may provide necessary control commands and vehicle capability information for a particular vehicle model to the cloud accessibility content creation module 518 so that the generated drive control content adheres to the capabilities of the vehicle where the system is running. The vehicle drive control SDK 524 includes a standard set of protocols and messages that enable the appropriate control mechanism for vehicle control, and a vehicle to interact with their subsystem, sensors, controller using common in-vehicle interfaces.

The transmission packet creation module 526 may be configured to form and transmit a custom protocol defined packet in order to deliver the generated cloud-based accessibility compliant HMI content and the cloud-based vehicle control content. The cloud feedback and self-learning module 528 filters the feedback received from the vehicle in terms of whether the content has been displayed or discarded due to at least one of network latency, context change, priority, and occupant's intervention, and stores that feedback into the driver information consumption and driving pattern data repository 508 for future use in determining the accessibility context.

Figure 6:
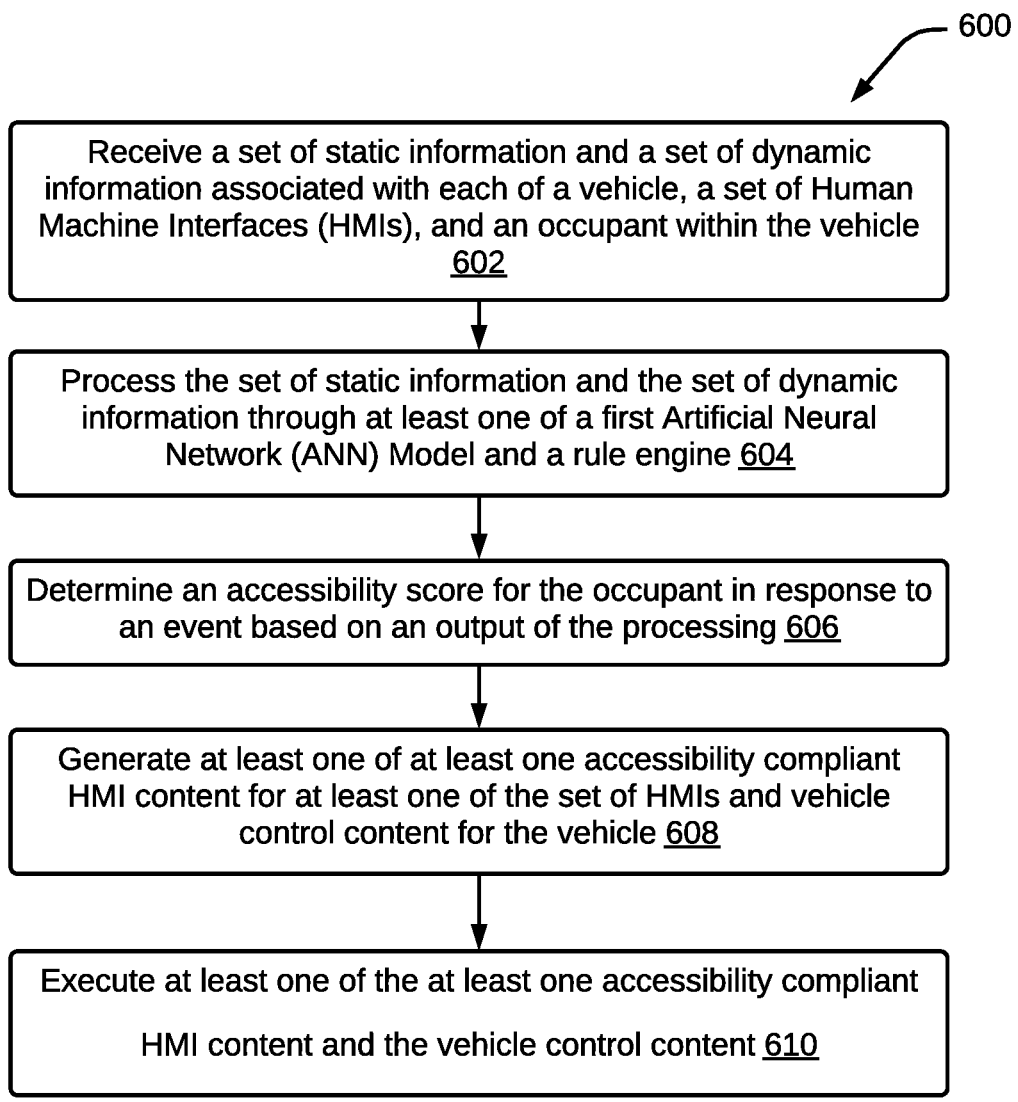
FIG. 6 is a flowchart of a method for providing assistance to vehicle occupants, in accordance with an embodiment.

Referring now to FIG. 6, a method of providing assistance to vehicle occupants is depicted via a flowchart 600, in accordance with an embodiment. Each step of the flowchart 600 may be performed by one or more of the modules 204-212 within the memory 104.

At step 602, a set of static information and a set of dynamic information may be received. The set of static information and the set of dynamic information may be associated with each of a vehicle, a set of Human Machine Interfaces (HMIs), and an occupant within the vehicle. It should be noted that the set of static information and the set of dynamic information corresponds to an environmental context and an accessibility context. Moreover, the environmental context may be determined based on the vehicle data and the environmental data. It should be noted that the environmental context may include information associated with at least one of current weather situation, traffic, drive terrain, ambient light, nearby vehicles, or pedestrians. Further, the accessibility context may be determined for the occupant for a particular time instance based on the vehicle data, the health information of the occupant, the environmental data, occupant's/driver's preferences, the HMI state information, and pre-determined accessibility data. In some embodiments, pre-determined accessibility data, HMI state fusion data, vehicle and environmental sensor data, and health sensor data, and user preferences may be captured to determine the environmental context and the accessibility context, as explained in conjunction with FIG. 3. At step 604, the set of static information and the set of dynamic information may be processed through at least one of a first Artificial Neural Network (ANN) Model and a rule engine.

At step 606, an accessibility score for the occupant may be determined in response to an event based on an output of the processing. Further, in some embodiments, an analysis on the processed set of static information and the set of dynamic information may be performed using static OEM accessibility rules and self-learning dynamic accessibility rules. Based on the analysis, an accessibility type and corresponding accessibility score may be determined in a pre-defined range. By way of an example, the predefined rage may be 1-10.

At step 608, at least one of at least one accessibility compliant HMI content may be generated for at least one of the set of HMIs and vehicle control content for the vehicle based on the accessibility score. It should be noted that the vehicle control content is associated with driving instructions. In some embodiments, a new accessibility compliant HMI content may be generated. In some other embodiments, to generate a modified accessibility compliant HMI content, the existing accessibility compliant HMI content may be modified using a plurality of available HMI components and based on information consumption patterns according to accessibility needs of the occupant. The plurality of available HMI components may include a vehicle native HMI software, cached HMI content from an associated cloud storage for a similar accessibility score, and cached HMI content from a neighboring vehicle. At step 610, at least one of the at least one accessibility compliant HMI content and the vehicle control content may be executed.

In some embodiments, validation data corresponding to the at least one accessibility compliant HMI content and the vehicle control content may be received from at least one neighboring vehicle via a V2X communication protocol. It should be noted that the validation data corresponds to the set of static information, the set of dynamic information, and the event. Moreover, based on the validation data, the at least one accessibility compliant HMI content and the vehicle control content may be validated.

In an embodiment, at least one of the at least one accessibility compliant HMI content and the vehicle control content may be rendered to at least one of a nearby vehicle and a pedestrian smartphone. Additionally, in an embodiment, an action in response to the executing may be received from the occupant. It should be noted that the action may be performed automatically when the occupant is unable to perform the action.

Figure 7:
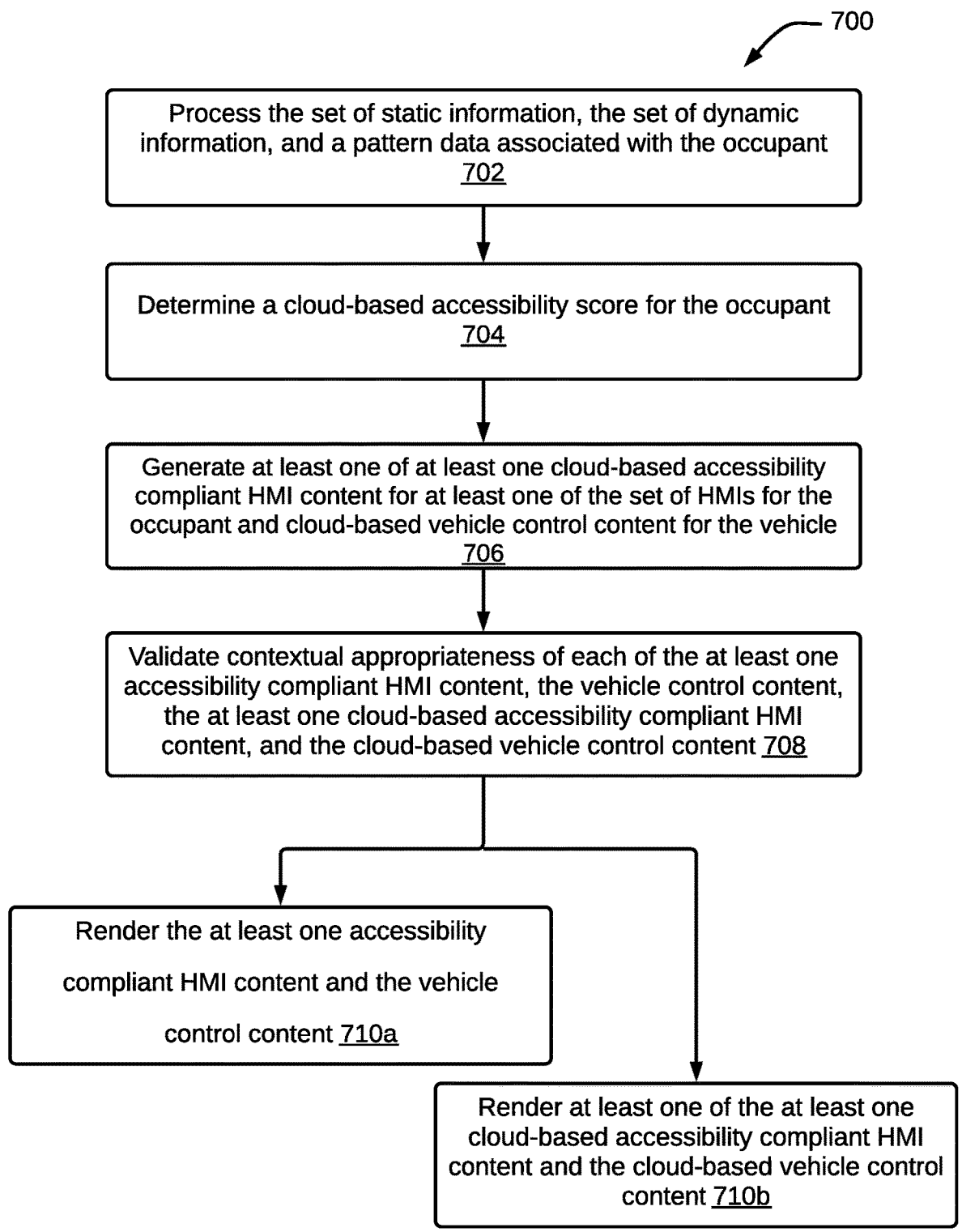
FIG. 7 is a flowchart of a method for rendering content in response to validation of the content, in accordance with an embodiment.

Referring now to FIG. 7, a method of rendering content in response to validation of the content is depicted via a flowchart 700, in accordance with an embodiment. Each step of the flowchart 700 may be performed by various modules of the cloud accessibility computation module 208. FIG. 7 is explained in conjunction to the FIGS. 1-6. At step 702, the set of static information, the set of dynamic information, and a pattern data associated with the occupant may be processed through at least one of a second ANN Model and a cloud-based rule engine. At step 704, a cloud-based accessibility score may be determined for the occupant in response to the event. The cloud-based accessibility score may be determined based on an output of the processing through at least one of the second ANN Model and the cloud-based rule engine.

At step 706, at least one of at least one cloud-based accessibility compliant HMI content for at least one of the set of HMIs for the occupant and cloud-based vehicle control content for the vehicle may be generated based on the cloud-based accessibility score. Thereafter, at step 708, contextual appropriateness of each of the at least one accessibility compliant HMI content, the vehicle control content, the at least one cloud-based accessibility compliant HMI content, and the cloud-based vehicle control content may be validated. The validation may be performed based on a current context associated with the occupant and the vehicle. Further, at step 710a, at least one of the at least one accessibility compliant HMI content and the vehicle control content may be rendered in response to the validation. At step 710b, at least one of the at least one cloud-based accessibility compliant HMI content and the cloud-based vehicle control content may be rendered in response to the validation.

In some embodiments, the accessibility compliant HMI content may be evaluated against the cloud-based accessibility compliant HMI content to determine whether it is necessary to generate a refined content based on quality of accessibility compliant HMI content, thereby ensuring that information may not always sent to the on-board accessibility computation module 204 (i.e., in-vehicle system) as there might be context loss due to network latency.

In some embodiments, the flow of at least one of the accessibility compliant HMI content, the vehicle control content, the cloud-based accessibility compliant HMI content, and the cloud-based vehicle control content may be controlled based on priority, quality, and effectiveness of the content, and the relevancy of the context. For example, the context may not exist anymore when the content arrives due to processing lag or network latency. Further, at least one of the accessibility compliant HMI content, the vehicle control content, the cloud-based accessibility compliant HMI content may be passed through a driver intervention block, where the occupant may accept/reject the incoming content manually.

Figure 8:
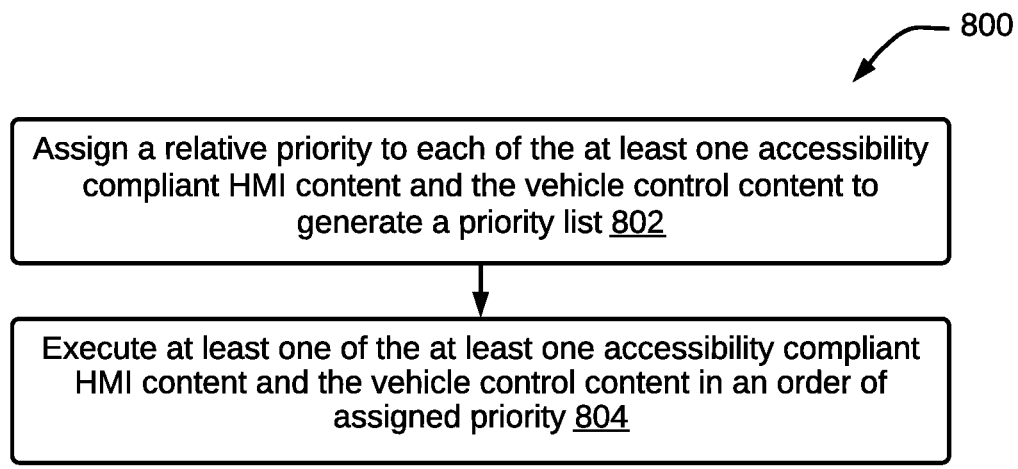
FIG. 8 is a flowchart of a method of executing content based on assigned priorities, in accordance with an embodiment.

Referring now to FIG. 8, a method of executing content based on assigned priorities is depicted via a flowchart 800, in accordance with an exemplary embodiment. Each step of the method may be performed using the priority control module 410. At step 802, a relative priority to each of the at least one accessibility compliant HMI content and the vehicle control content may be assigned to generate a priority list. It may be noted that the priority list is dynamically modified based on the event at a time instance. At step 804, at least one of the at least one accessibility compliant HMI content and the vehicle control content may be executed in an order of assigned priority for the time instance. This has already been explained in conjunction with FIG. 4.

The present disclosure may provide many advantages in order to overcome the problems encountered in conventional systems and methods. The disclosure helps in delivering accessibility compliant HMI content which is best suited for an occupant without any delay. Further, the disclosed system has an ability to react to a fatal condition of the occupant, for the emergency services/nearby pedestrian/vehicle. Furthermore, the disclosure intelligently determines the accessibility needs of the occupants at runtime, generates accessible information for crucial events dynamically inside a vehicle native software and/or in a cloud service, communicates vehicle critical information in an effective way maintaining the determined accessibility needs of the occupants.

The system 100 and associated assistance device 102 provides assistance not only based on static accessibility needs of the occupants but also the dynamic accessibility needs of the occupants and the environmental accessibility needs. By way of an example, consider a situation where the occupant's accessibility need may be permanent or pre-determined. The occupant may be suffering from Parkinson's disease and uses an autonomous vehicle. The occupant may not have the mortar skills and ability to respond to certain information or events by pressing hardware buttons in the autonomous vehicle (such as, pressing a steering wheel control to receive an incoming call). Also, for an instance, an occupant with partial or full color blindness may not be able to differentiate between two colors such as, between red and amber colored vehicle critical telltales (red and amber colored alerts that pop up on the autonomous vehicle screen).

For the dynamic accessibility needs may be temporary accessibility needs of the occupants. For an instance, a person with hyperopia (i.e., far-sightedness) who has lost his glasses in office and is about to return home in his autonomous vehicle without the glasses somewhere may be unable to focus on small telltales or vehicle critical information, which appears close to his eye on the instrument cluster. Also, for another instance, a person suffering from sleep-deprivation and fatigue may need more time to process the information displayed on the vehicle HMI which typically appears for a short period of time.

The environmental accessibility needs may include situational accessibility needs of the occupant. For example, when the vehicle passes through an area with high decibel noise, the occupant may be unable to hear any audio message (such as, traffic alerts) from the vehicle speakers. Also, information displayed on the HUD display may not be clearly visible to the occupant when the vehicle passes through an area where sunlight is directly cast on the windscreen.

Figure 9:
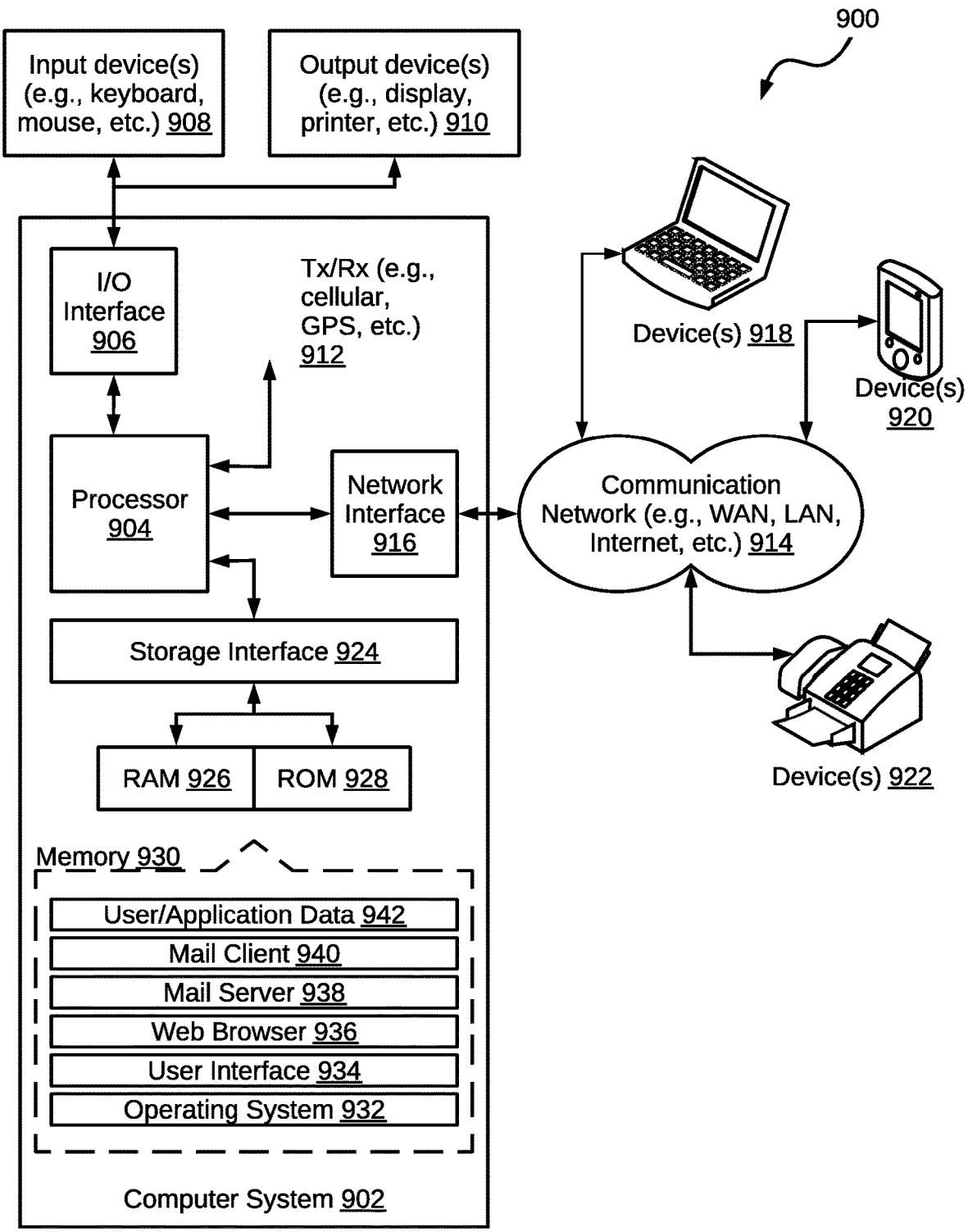
FIG. 9 illustrates a block diagram of an exemplary computer system for implementing embodiments consistent with the present disclosure.

Referring now to FIG. 9, a block diagram 900 of an exemplary computer system 902 for implementing various embodiments is illustrated. Computer system 902 may include a central processing unit ("CPU" or "processor") 904. Processor 904 may include at least one data processor for executing program components for executing user or system-generated requests. A user may include a person, a person using a device such as those included in this disclosure, or such a device itself. Processor 904 may include specialized processing units such as integrated system (bus) controllers, memory management control units, floating point units, graphics processing units, digital signal processing units, etc. Processor 904 may include a microprocessor, such as AMD® ATHLON® microprocessor, DURON® microprocessor OR OPTERON® microprocessor, ARM's application, embedded or secure processors, IBM® POW-ERPC®, INTEL'S CORE® processor, ITANIUM® processor, XEON® processor, CELERON® processor or other line of processors, etc. Processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 904 may be disposed in communication with one or more input/output (I/O) devices via an I/O interface 906. I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 1402.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 906, computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 910 may be a printer, fax machine, video display (for example, cathode ray tube (CRT), liquid crystal display (LCD), light-emitting diode (LED), plasma, or the like), audio speaker, etc. In some embodiments, a transceiver 912 may be disposed in connection with processor 904. Transceiver 912 may facilitate various types of wireless transmission or reception. For example, transceiver 912 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 904 may be disposed in communication with a communication network 910 via a network interface 916. Network interface 916 may communicate with communication network 914. Network interface 916 may employ connection protocols including, without limitation, direct connect, Ethernet (for example, twisted pair 50/500/5000 Base T), transmission control protocol/internet protocol (TCP/IP), error type ring, IEEE 802.11a/b/g/n/x, etc. Communication network 914 may include, without limitation, a direct interconnection, local area network (LAN), wide area network (WAN), wireless network (for example, using Wireless Application Protocol), the Internet, etc. Using network interface 916 and communication network 914, computer system 902 may communicate with devices 918, 920, and 922. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereaderx, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 902 may itself embody one or more of these devices.

In some embodiments, processor 904 may be disposed in communication with one or more memory devices (for example, RAM 926, ROM 928, etc.) via a storage interface 924. Storage interface 924 may connect to memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 930 may store a collection of program or database components, including, without limitation, an operating system 932, user interface application 934, web browser 936, mail server 938, mail client 940, user/application data 942 (for example, any data variables or data records discussed in this disclosure), etc. Operating system 932 may facilitate resource management and operation of computer system 902. Examples of operating systems 932 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 934 may facilitate display, execution, interaction, manipulation, or operation of program components through textual or graphical facilities. For example, user interfaces 934 may provide computer interaction interface elements on a display system operatively connected to computer system 902, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 902 may implement a web browser 936 stored program component. Web browser 936 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers936 may utilize facilities such as AJAX, DHTML, ADOBE® FLASH® platform, JAVASCRIPT® programming language, JAVA® programming language, application programming interfaces (APis), etc. In some embodiments, computer system 902 may implement a mail server 938 stored program component. Mail server 938 may be an Internet mail server such as MICROSOFT® EXCHANGE® mail server, or the like. Mail server 938 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 938 may utilize communication protocols such as internet message access protocol (IMAP), messaging application programming interface (MAPI), Microsoft Exchange, post office protocol (POP), simple mail transfer protocol (SMTP), or the like. In some embodiments, computer system 902 may implement a mail client 940 stored program component. Mail client 940 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 902 may store user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described system and method for providing assistance to vehicle occupants. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of providing assistance to vehicle occupants, the method comprising:
receiving, by an assistance device, a set of static information and a set of dynamic information associated with each of a vehicle, a set of Human Machine Interfaces (HMIs), and at least one occupant within the vehicle;
processing, by the assistance device, the set of static information and the set of dynamic information through at least one of a first Artificial Neural Network (ANN) Model and a rule engine by:
determining, by the assistance device, an environmental context from vehicle data and environmental data provided in at least one of the set of static information and the set of dynamic information, wherein the environmental data includes information associated with at least one of current weather situation, traffic, drive terrain, ambient light, nearby vehicles, or pedestrians;
determining, by the assistance device, an accessibility context from at least one of the set of static information and the set of dynamic information, wherein the accessibility context is determined for at least one occupant for a particular time instance based on information, provided in at least one of, the set of static information and in the set of dynamic information, including the vehicle data, health information of the at least one occupant, the environmental data, driving preferences of the at least one occupant, HMI state information, and pre-determined accessibility data pertaining to the at least one occupant;
determining, by the assistance device, an accessibility score for the occupant in response to an event based on the determined environmental context and the determined accessibility context;
generating, by the assistance device, at least one of at least one accessibility compliant HMI content for at least one of the set of HMIs and vehicle control content for the vehicle based on the accessibility score, wherein the vehicle control content is associated with driving instructions; and
executing, by the assistance device, at least one of the at least one accessibility compliant HMI content and the vehicle control content, wherein executing the vehicle control content includes automatically performing an action to control the vehicle.

2. The method of claim 1, further comprising:
processing the set of static information, the set of dynamic information, and a pattern data associated with the occupant through at least one of a second ANN Model and a cloud-based rule engine;
determining a cloud-based accessibility score for the occupant in response to the event based on an output of the processing through at least one of the second ANN Model and the cloud-based rule engine;
generating at least one of at least one cloud-based accessibility compliant HMI content for at least one of the set of HMIs for the occupant and cloud-based vehicle control content for the vehicle, based on the cloud-based accessibility score;
validating of each of the at least one accessibility compliant HMI content, the vehicle control content, the at least one cloud-based accessibility compliant HMI content, and the cloud-based vehicle control content, based on a current context associated with the occupant and the vehicle; and
rendering, in response to the validating, one of:
at least one of the at least one accessibility compliant HMI content and the vehicle control content; or
at least one of the at least one cloud-based accessibility compliant HMI content and the cloud-based vehicle control content.

3. The method of claim 1, further comprising:
assigning a relative priority to each of the at least one accessibility compliant HMI content and the vehicle control content to generate a priority list, wherein the priority list is dynamically modified based on the event at a time instance; and
executing at least one of the at least one accessibility compliant HMI content and the vehicle control content in an order of assigned priority for the time instance.

4. The method of claim 1, further comprising:
receiving validation data corresponding to the at least one accessibility compliant HMI content and the vehicle control content from at least one neighbouring vehicle via V2X communication protocol, wherein the validation data corresponds to the set of static information, the set of dynamic information, and the event; and
validating the at least one accessibility compliant HMI content and the vehicle control content based on the received validation data.

5. The method of claim 1, wherein generating the at least one accessibility compliant HMI content on at least one of the set of HMIs comprises at least one of:
creating a new accessibility compliant HMI content; and
modifying an existing accessibility compliant HMI content to generate a modified accessibility compliant HMI content using a plurality of available HMI components, wherein the plurality of available HMI components comprises a vehicle native HMI software, cached HMI content from an associated cloud storage for a similar accessibility score, and cached HMI content from a neighboring vehicle.

6. The method of claim 1, further comprising rendering at least one of the at least one accessibility compliant HMI content and the vehicle control content to at least one of a nearby vehicle and a pedestrian smartphone.

7. A system for providing assistance to vehicle occupants, the system comprising:
a processor; and
a memory communicatively coupled to the processor, wherein the memory stores processor instructions, which, on execution, cause the processor to:

receive a set of static information and a set of dynamic information associated with each of a vehicle, a set of Human Machine Interfaces (HMIs), and at least one occupant within the vehicle;

process the set of static information and the set of dynamic information through at least one of a first Artificial Neural Network (ANN) Model and a rule engine by:

determining an environmental context from vehicle data and environmental data provided in at least one of, the set of static information and the set of dynamic information, wherein the environmental data includes information associated with at least one of current weather situation, traffic, drive terrain, ambient light, nearby vehicles, or pedestrians;

determining an accessibility context from at least one of the set of static information and the set of dynamic information, wherein the accessibility context is determined for at least one occupant for a particular time instance based on information, provided in at least one of the set of static information and in the set of dynamic information, including the vehicle data, health information of the at least one occupant, the environmental data, driving preferences of the at least one occupant, HMI state information, and pre-determined accessibility data pertaining to the at least one occupant;

determine an accessibility score for the occupant in response to an event based on the determined environmental context and the determined accessibility context;

generate at least one of at least one accessibility compliant HMI content for at least one of the set of HMIs and vehicle control content for the vehicle based on the accessibility score, wherein the vehicle control content is associated with driving instructions; and execute at least one of the at least one accessibility compliant HMI content and the vehicle control content, wherein executing the vehicle control content includes automatically performing an action to control the vehicle.

8. The system of claim 7, wherein the processor instructions further cause the processor to:

process the set of static information, the set of dynamic information, and a pattern data associated with the occupant through at least one of a second ANN Model and a cloud-based rule engine;

determine a cloud-based accessibility score for the occupant in response to the event based on an output of the processing through at least one of the second ANN Model and the cloud-based rule engine;

generate at least one of at least one cloud-based accessibility compliant HMI content for at least one of the set of HMIs for the occupant and cloud-based vehicle control content for the vehicle, based on the cloud-based accessibility score;

validate contextual appropriateness of each of the at least one accessibility compliant HMI content, the vehicle control content, the at least one cloud-based accessibility compliant HMI content, and the cloud-based vehicle control content, based on a current context associated with the occupant and the vehicle; and render, in response to the validating, one of:

at least one of the at least one accessibility compliant HMI content and the vehicle control content; or at least one of the at least one cloud-based accessibility compliant HMI content and the cloud-based vehicle control content.

9. The system of claim 7, wherein the processor instructions further cause the processor to:

assign a relative priority to each of the at least one accessibility compliant HMI content and the vehicle control content to generate a priority list, wherein the priority list is dynamically modified based on the event at a time instance; and execute at least one of the at least one accessibility compliant HMI content and the vehicle control content in an order of assigned priority for the time instance.

10. The system of claim 7, wherein the processor instructions further cause the processor to:

receive validation data corresponding to the at least one accessibility compliant HMI content and the vehicle control content from at least one neighbouring vehicle via V2X communication protocol, wherein the validation data corresponds to the set of static information, the set of dynamic information, and the event; and validate the at least one accessibility compliant HMI content and the vehicle control content based on the received validation data.

11. The system of claim 7, wherein the processor instructions cause the processor to generate the at least one accessibility compliant HMI content on at least one of the set of HMIs comprises at least one of:

create a new accessibility compliant HMI content; and modify an existing accessibility compliant HMI content to generate a modified accessibility compliant HMI content using a plurality of available HMI components, wherein the plurality of available HMI components comprises a vehicle native HMI software, cached HMI content from an associated cloud storage for a similar accessibility score, and cached HMI content from a neighboring vehicle.

12. The system of claim 7, wherein the processor instructions further cause the processor to render at least one of the at least one accessibility compliant HMI content and the vehicle control content to at least one of a nearby vehicle and a pedestrian smartphone.

13. A non-transitory computer-readable medium for providing assistance to vehicle occupants, having stored thereon, a set of computer-executable instructions causing one or more processors to perform steps comprising:

receiving a set of static information and a set of dynamic information associated with each of a vehicle, a set of Human Machine Interfaces (HMIs), and at least one occupant within the vehicle;

processing the set of static information and the set of dynamic information through at least one of a first Artificial Neural Network (ANN) Model and a rule engine by:

determining an environmental context from vehicle data and environmental data provided in at least one of, the set of static information and the set of dynamic information, wherein the environmental data includes information associated with at least one of current weather situation, traffic, drive terrain, ambient light, nearby vehicles, or pedestrians;

determining an accessibility context from at least one of the set of static information and the set of dynamic information, wherein the accessibility context is determined for at least one occupant for a particular time instance based on information, provided in at least one of, the set of static information and in the set of dynamic information, including the vehicle data, health information of the at least one occupant, the environmental data, driving preferences of the at least one occupant, HMI state information, and predetermined accessibility data pertaining to the at least one occupant;

determining an accessibility score for the occupant in response to an event based on the determined environmental context and the determined accessibility context;

generating at least one of at least one accessibility compliant HMI content for at least one of the set of HMIs and vehicle control content for the vehicle based on the accessibility score, wherein the vehicle control content is associated with driving instructions; and executing at least one of the at least one accessibility compliant HMI content and the vehicle control content, wherein executing the vehicle control content includes automatically performing an action to control the vehicle.

14. A non-transitory computer-readable medium of claim 13, wherein the set of computer-executable instructions further causes the one or more processors to perform steps comprising:

processing the set of static information, the set of dynamic information, and a pattern data associated with the occupant through at least one of a second ANN Model and a cloud-based rule engine;

determining a cloud-based accessibility score for the occupant in response to the event based on an output of the processing through at least one of the second ANN Model and the cloud-based rule engine;

generating at least one of at least one cloud-based accessibility compliant HMI content for at least one of the set of HMIs for the occupant and cloud-based vehicle control content for the vehicle, based on the cloud-based accessibility score;

validating contextual appropriateness of each of the at least one accessibility compliant HMI content, the vehicle control content, the at least one cloud-based accessibility compliant HMI content, and the cloud-based vehicle control content, based on a current context associated with the occupant and the vehicle; and rendering, in response to the validating, one of:
 at least one of the at least one accessibility compliant HMI content and the vehicle control content; or
 at least one of the at least one cloud-based accessibility compliant HMI content and the cloud-based vehicle control content.

* * * * *